(12) United States Patent
Suppan et al.

(10) Patent No.: US 7,334,196 B2
(45) Date of Patent: Feb. 19, 2008

(54) USER INTERFACE DISPLAY NAVIGATION AND ITEM SELECTION SYSTEM

(75) Inventors: Scott John Suppan, Allentown, PA (US); John D. Haley, Honey Brook, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 926 days.

(21) Appl. No.: 10/158,808

(22) Filed: May 31, 2002

(65) Prior Publication Data

US 2002/0196293 A1    Dec. 26, 2002

Related U.S. Application Data

(60) Provisional application No. 60/300,737, filed on Jun. 25, 2001.

(51) Int. Cl.
  *G06F 17/00* (2006.01)
(52) U.S. Cl. .................. 715/853; 715/854; 715/764
(58) Field of Classification Search ........ 715/762–765, 715/845, 821, 853–855, 500, 526, 513–517, 715/819, 835, 907, 861
  See application file for complete search history.

(56) References Cited

U.S. PATENT DOCUMENTS

| 5,644,736 | A |   | 7/1997  | Healy et al.       | 395/341 |
|-----------|---|---|---------|--------------------|---------|
| 5,701,137 | A |   | 12/1997 | Kiernan et al.     | 345/119 |
| 5,794,178 | A | * | 8/1998  | Caid et al.        | 704/9   |
| 5,838,965 | A |   | 11/1998 | Kavanagh et al.    | 395/614 |
| 5,913,063 | A |   | 6/1999  | McGurrin et al.    | 395/702 |
| 5,923,328 | A | * | 7/1999  | Griesmer           | 715/854 |
| 5,923,330 | A | * | 7/1999  | Tarlton et al.     | 345/419 |
| 5,999,190 | A |   | 12/1999 | Sheasby et al.     | 345/431 |
| 6,003,040 | A |   | 12/1999 | Mital et al.       | 707/103 |
| 6,028,602 | A |   | 2/2000  | Weidenfeller et al.| 345/340 |
| 6,105,044 | A | * | 8/2000  | DeRose et al.      | 715/514 |
| 6,111,579 | A |   | 8/2000  | Alimpich et al.    | 345/356 |
| 6,115,044 | A |   | 9/2000  | Alimpich et al.    | 345/356 |
| 6,128,016 | A |   | 10/2000 | Coelho et al.      | 345/347 |
| 6,151,024 | A |   | 11/2000 | Alimpich et al.    | 345/357 |
| 6,189,012 | B1|   | 2/2001  | Mital et al.       | 707/103 |

(Continued)

FOREIGN PATENT DOCUMENTS

WO    WO 99/22295    5/1999

*Primary Examiner*—Tadesse Hailu
(74) *Attorney, Agent, or Firm*—Alexander J. Burke (57) ABSTRACT

A user interface system supports flexible user navigation and item selection and manipulation in a hierarchical data structure representation. The user interface system facilitates selection of a plurality of items from a display of hierarchically organized items. The user interface system includes a user interface image generator for providing data representing a displayable image showing a hierarchical organization of user selectable icons visually identifying whether the selectable icons are currently selected. The hierarchical organization of icons links a parent icon representing a first group of data items with multiple child icons representing corresponding data items of the first group and an individual one of the child icons links to a second group of grandchild icons representing a corresponding second group of data items. The user interface system also includes a user interface command processor for initiating selection of direct ancestor icons of the grandchild icon comprising the parent icon and the individual one of the child icons excluding others of the child icons, in response to user activation of a mode of selection of the grandchild icon.

21 Claims, 7 Drawing Sheets

U.S. PATENT DOCUMENTS

| | | | |
|---|---|---|---|
| 6,189,019 B1* | 2/2001 | Blumer et al. | 715/513 |
| 6,236,400 B1* | 5/2001 | Guerrero | 715/841 |
| 6,281,896 B1 | 8/2001 | Alimpich et al. | 345/340 |
| 6,292,792 B1* | 9/2001 | Baffes et al. | 706/45 |
| 6,341,280 B1 | 1/2002 | Glass et al. | 707/3 |
| 6,393,427 B1 | 5/2002 | Vu et al. | 707/101 |
| 6,462,762 B1* | 10/2002 | Ku et al. | 715/853 |
| 6,484,190 B1* | 11/2002 | Cordes et al. | 715/514 |
| 6,556,983 B1* | 4/2003 | Altschuler et al. | 706/55 |
| 6,754,885 B1* | 6/2004 | Dardinski et al. | 717/113 |
| 6,765,597 B2* | 7/2004 | Barksdale et al. | 715/853 |
| 6,816,175 B1* | 11/2004 | Hamp | 715/854 |
| 6,819,339 B1* | 11/2004 | Dowling | 715/738 |
| 7,076,763 B1* | 7/2006 | DeGroote et al. | 717/112 |
| 2001/0007987 A1* | 7/2001 | Igata | 707/3 |
| 2001/0051961 A1* | 12/2001 | Duxbury | 707/517 |
| 2002/0057269 A1* | 5/2002 | Barber et al. | 345/418 |
| 2002/0097278 A1* | 7/2002 | Mandler et al | 345/854 |
| 2002/0107892 A1* | 8/2002 | Chittu et al. | 707/514 |

* cited by examiner

```
                                340
                                 /
                public abstract class Shape
                {
                  public abstract double area( );
                  public abstract double circumference( );
                }
```

```
public class Circle extends Shape ——450
{
    protected double r;
    protected static final double PI = 3.14159265358979323846;
    public Circle()
    { r = 1.0; } public Circle(double r)
    { this.r = r; } public double area()
    { return PI + r + r; } public double circumference()
    { return 2 + PI + r; } public double getRadius()
    { return r; } public void setRadius(double r)
    { this.r = r; }
}
```

```
< DataSpec Name = "test" Context = "System">
< SmsTtnPerson ClassName = "com.sms.ttn.admin.SMsTtnPerson">
  < activeMailingAddress ClassName = "com.sms.ttn.admin.SmsTtn.admin.SmsTtnPersonAddressUsage" >
    < person ClassName = "com.sms.ttn.admin.SmsTtnPerson" >
      < formattedName Type = "STRING"/>
    < /person >
    < personAddress ClassName = "com.sms.ttn.admin.SmsTtnPersonAddress" >
      < cityName Type = "STRING"/>
      < countryName Type = "STRING"/>
      < stateCode ClassName = "com.sms.tnt.allowablevalues.SmsTtnPersonAddress" >
        < description Type = "STRING"/>
      < stateCode >
      < zipCode Type = "STRING"/>
    < /personAddress >
  < /activeMailingAddress >
  < activeResidenceAddress ClassName = "com.sms.ttn.admin.SmsTtn.admin.SmsTtnPersonAddressUsage" >
    < person ClassName = "com.sms.ttn.admin.SmsTtnPerson" >
      < formattedName Type = "STRING"/>
    < /person >
    < personAddress ClassName = "com.sms.ttn.admin.SmsTtnPersonAddress" >
      < cityName Type = "STRING"/>
      < countryName Type = "STRING"/>
      < stateCode ClassName = "com.sms.tnt.allowablevalues.SmsTtnCodedValue" >
        < description Type = "STRING"/>
      < stateCode >
      < zipCode Type = "STRING"/>
    < /personAddress >
  < /activeResidenceAddress >
  < age ClassName = "com.sms.ttn.admin.SmsTtnAge" >
    < ageInYears Type = "NUMERIC"/>
  < /age >
< SmsTtnPerson >
< DataSpec >
```

FIG. 11

USER INTERFACE DISPLAY NAVIGATION AND ITEM SELECTION SYSTEM

This is a non-provisional application of provisional application Ser. No. 60/300,737 by J. D. Haley et al. filed Jun. 25, 2001.

FIELD OF THE INVENTION

This invention concerns a user interface system facilitating navigation and selection of displayed items from a display of hierarchically organized items.

BACKGROUND OF THE INVENTION

Hierarchically organized data or other structures are commonly represented in a display image by a tree-like organization of icons representing corresponding data elements of the hierarchical data structure. Further it is common to present such a hierarchical data structure representation in a first window of a composite image with the contents (or another attribute or property) of a currently selected item of the first window being displayed in a second window of the composite image. Such hierarchical data structure representations may be used for a multitude of purposes including, for example, selecting properties and attributes of software objects employed by an executable procedure to determine the function performed by the procedure. However, known systems have a number of limitations and deficiencies limiting user ability to select items and manipulate items in a hierarchical data structure representation and to navigate the data structure representation. Specifically, known systems typically require substantial manual effort to create new parent data elements and subset elements in a data hierarchy. Further, known systems lack user friendly interfaces and have limited capability for sorting, filtering, copying and deleting particular data elements and categories of data elements in a data hierarchy. A system according to invention principles addresses these deficiencies and derivative problems.

SUMMARY OF INVENTION

A user interface system supports flexible user navigation and item selection and manipulation in a hierarchical data structure representation. The user interface system facilitates selection of a plurality of items from a display of hierarchically organized items. The user interface system includes a user interface image generator for providing data representing a displayable image showing a hierarchical organization of user selectable icons visually identifying whether the selectable icons are currently selected. The hierarchical organization of icons links a parent icon representing a first group of data items with multiple child icons representing corresponding data items of the first group and an individual one of the child icons links to a second group of grandchild icons representing a corresponding second group of data items. The user interface system also includes a user interface command processor for initiating selection of direct ancestor icons of the grandchild icon comprising the parent icon and the individual one of the child icons excluding others of the child icons, in response to user activation of a mode of selection of the grandchild icon.

In a feature of the invention, the command processor initiates selection of child icons excluding any child icon linked to a group of grandchild icons, in response to user activation of a mode of selection of a parent icon.

BRIEF DESCRIPTION OF THE DRAWING

FIG. 11 shows an exemplary XML representation of data including software objects, according to invention principles.

DETAILED DESCRIPTION OF PREFERRED EMBODIMENTS

A user interface system supports flexible selection and manipulation of data representative items in a display of hierarchically organized items as well as flexible navigation through the hierarchically organized items. Although the user interface system is described in the context of a system for processing and manipulating XML representations of data, this is exemplary only. XML (Extensible Markup Language) is used to encode structured data passed between computer systems and is determined by a standard maintained by the World Wide Web Consortium (see http://www.w3.org/XML). The user interface system is applicable for manipulating items representing any entities such as files, objects, programs, multimedia data, documents, active data elements (e.g., streaming Internet data), passive data elements (e.g., records), goods, resources, catalog elements and other items. Further, although in the exemplary embodiment of FIG. 1 a system and user interface creates and manipulates XML representations of data (including objects, properties and attributes), the described user interface system is not limited to manipulating such XML representations of data.

Figure 1:
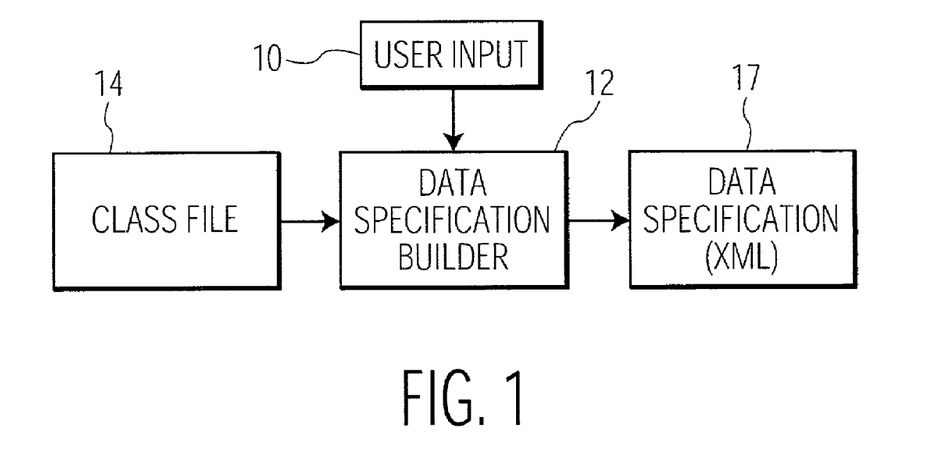
FIG. 1 shows a system for creating XML representations of data including software objects, according to invention principles.

The FIG. 1 system supports user creation, maintenance and manipulation of XML files of object-oriented data. In the FIG. 1 system XML format data specification 17 (representing object oriented data) is produced by specification builder 12 from files of class data 14 in response to user commands and preferences 10. Specifically, a user employs unit 12 to generate data representing user interface display images and to navigate a resulting hierarchical organization of user selectable icons (representing a Java class property hierarchy) to select individual class properties required for use by an executable application. A user selectable icon as used herein comprises a user selectable image element including, a data item representative element, a status indicator identifying selection status of a data representative item, a feature associated with a data representative item, a button, a prompt element, a menu item, a prompt element with a list of selectable options and a data entry element. The selected properties are processed by unit 12 in creating XML specification 17. Class data and sub-class data (as known in the object-oriented programming language art) is used to define properties of an object and associated methods (procedures). A class typically defines its own unique properties in addition to inheriting some properties. Specification builder 12 supports multiple functions. Specifically, unit 12 enables a user to point and click (e.g., using a cursor controlled mouse) to expand items representing classes and subclasses to display component elements as well as to list and display all properties of a class and to designate one or more properties for inclusion or exclusion in XML format data specification 17. The unit 12 user interface system enables a user to select specific class properties for inclusion in XML format data specification 17 which represents a subset of available class data that may be used by an application. Unit 12 also supports creation, use and maintenance of procedures for automatically filtering available data elements to incorporate selected elements in designated classes or parent elements and to remove undesired or redundant class properties or other data elements.

User created executable procedures in unit 12 are used to substitute one selected data element for another within a designated class or parent element and to copy a designated data element from one place in a hierarchical data structure to another. Unit 12 executable procedures also include a user interface command processor for initiating selection of displayed icons in response to user command. A search function in unit 12 also supports searching for particular properties or data elements within a hierarchical data structure. Further, a search depth may be specified to limit the search to a desired number of levels in the hierarchy. Such a search or data element filter procedure may be employed to go to class properties that were flagged by the system as being irrelevant or obsolete due to changes in the data hierarchy upon which XML representation 17 is based. Unit 12 also enables creation of additional class and class property data elements representing specific subsets of object-oriented data or other subset data elements for use by executable applications. The unit 12 user interface system facilitates quick and easy creation of class and other types of parent and child elements in a hierarchical data structure. Further, a change to class file data 14 (e.g., removal of obsolete data identified using unit 12) is readily processed by unit 12 to form updated XML format data specification 17. The created XML format data specification 17 is easier to read, interpret and communicate to other applications than class file data 14 which may be composed of byte codes or other intermediate language code.

Figure 2:
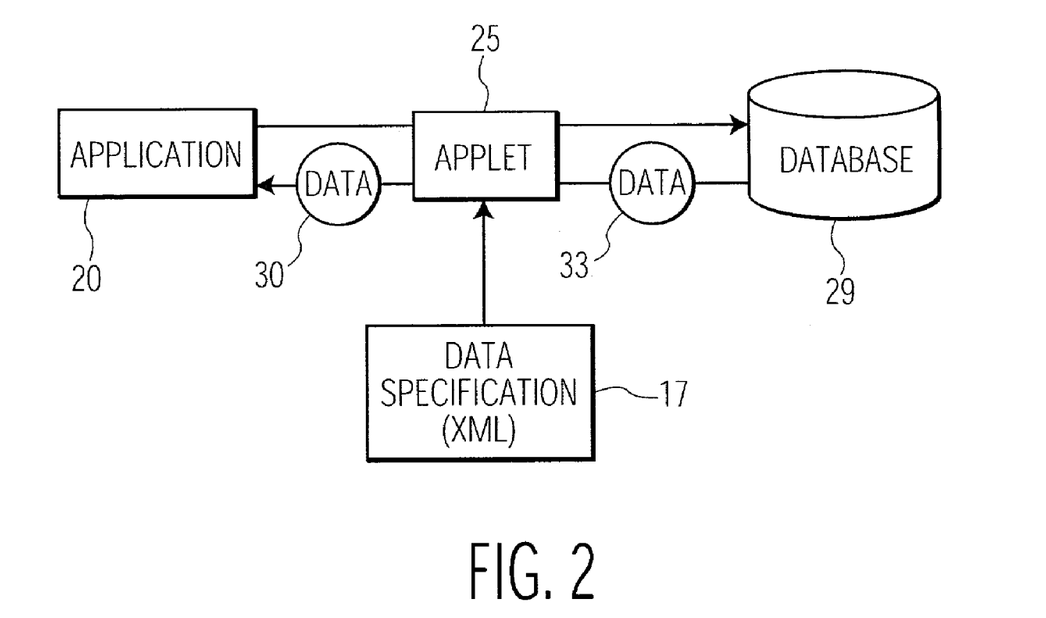
FIG. 2 shows a system for processing XML representations of data, according to invention principles.

FIG. 2 shows a system for processing XML representations of data. Specifically, applet 25 uses XML data specification 17 in filtering data 33 returned from database 29 in response to a query for information received by database 29 from application 20. The filtered data 30 produced by applet 25 is forwarded by applet 25 to application 20. For this purpose applet 25 parses XML data specification 17 to determine from specification 17 the class properties used by application 20. Thereby applet 25 filters data 33 to provide filtered data 30 incorporating the desired properties (as determined by specification 17) to application 20 and to exclude other properties. Thereby specification 17 is advantageously used to reduce the quantity of information returned by the query from application 20 to database 29. In this manner, application 20 processes reduced size objects containing desired data.

Figure 3:
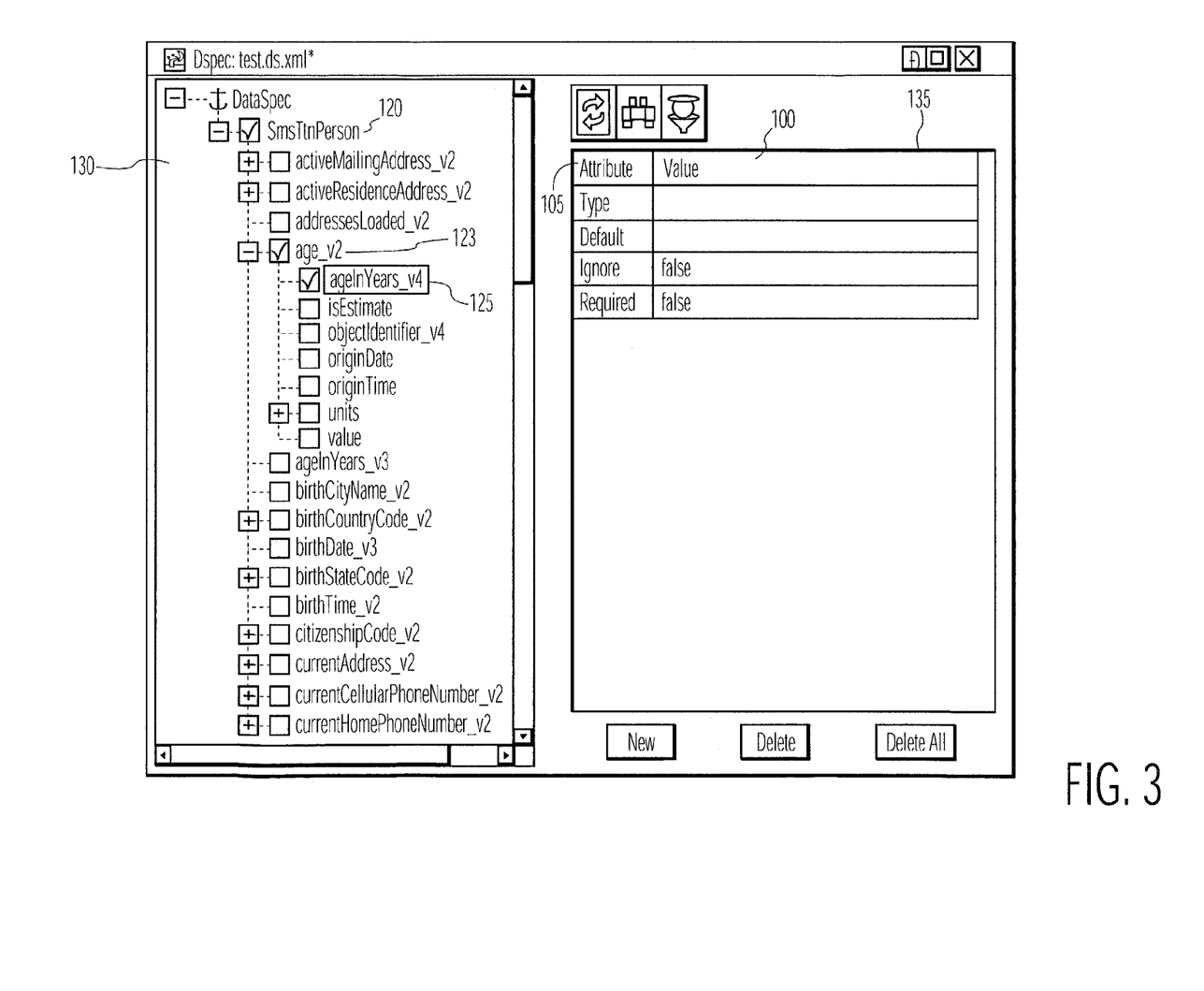
FIG. 3 shows a user interface display image representation of hierarchically structured data elements facilitating user selection of particular hierarchically related data elements, according to invention principles.

FIG. 3 shows a user interface display image representation of hierarchically structured data elements produced by a user interface image generator in unit 12 (FIG. 1) and facilitating user selection of particular data elements. The system provides a graphical hierarchical representation of the data in window 130 from which the user may select individual items (in this case items representing Java class properties). In order to do this, a user selects plus signs adjacent to displayed class representative items and subclass names to expand these items in order to view the corresponding class and subclass properties. A user may do this by using a mouse to point and click, or by other known navigation and item selection methods. The properties are listed alphabetically to facilitate locating specific properties. In response to user activation of a mode of selection of a specific property name (such as by double clicking on the desired property name) a red checkmark (e.g., checkmarks for items 120, 123 and 125) is displayed adjacent to the property name. Other user activation modes may include, for example, selecting an item of a menu associated with the desired property name and an activating selection of the desired property name itself.

The unit 12 (FIG. 1) user interface system advantageously supports user selection and inclusion of a class property and its ancestor properties within the hierarchically structured data elements of window 130 (FIG. 3). The unit 12 user interface image generator also generates window 135 incorporating a menu for indicating attributes (items 105) associated with a user selected icon (in window 130) and an associated data item (items 100). In window 130, for example, selection of ageInYears (grandchild) property item 125 results in selection of age class (child) item 123 and SmsTtnPerson (parent) class 120 excluding others of said child item 123 and parent item 120. Property items may also be excluded in response to user command. For example, ageInYears item 125 is deselected upon user double clicking on its adjacent checkmark (a current selection and inclusion indicator) which also results in deselection of ancestor property items 123 and 120. Such deselection also removes the checkmarks adjacent to items 125, 123 and 120. However, ancestor property items are not removed in response to such deselection if the ancestor items include any children properties which are currently selected or included.

Further, the FIG. 3 hierarchical display of window 130 facilitates user selection of child class properties of a parent class item but excludes those child class properties that are themselves a class of properties. This is done in response to user selection of the parent class item. For example, in response to user selection of age class 123 (e.g., by double clicking on the item or through another user selection method) child properties selected include ageInYears, isEstimate, objectIdentifier, originDate, originTime, and value but exclude the "units" item. The "units" item is not automatically included because it is itself a class of properties. For it to be included it is necessary for the user to select it individually.

Figure 4:
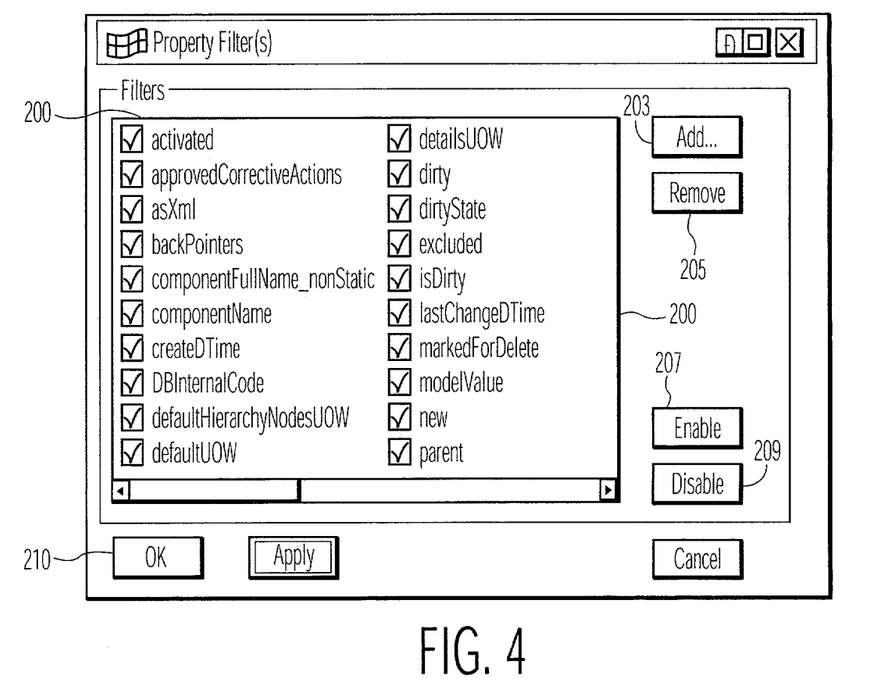
FIG. 4 shows a user interface display image supporting user enabled filtering of data elements, according to invention principles.

FIG. 4 shows a user interface display image supporting user enabled filtering of data elements. The capability of filtering data elements such as class properties and excluding particular properties from being automatically included (e.g., following user selection of a class item as previously described in connection with FIG. 3) is of particular value where a class is composed of large numbers, perhaps hundreds or more, properties. The system of unit 12 (FIG. 1) enables a user to create and manage property filters that may exclude class properties before they are presented in a display image such as in window 130 of FIG. 3, for example. Thereby those properties that are not relevant to a desired application function may be excluded from a user interface display used in providing XML data for implementing such a function.

Figure 5:
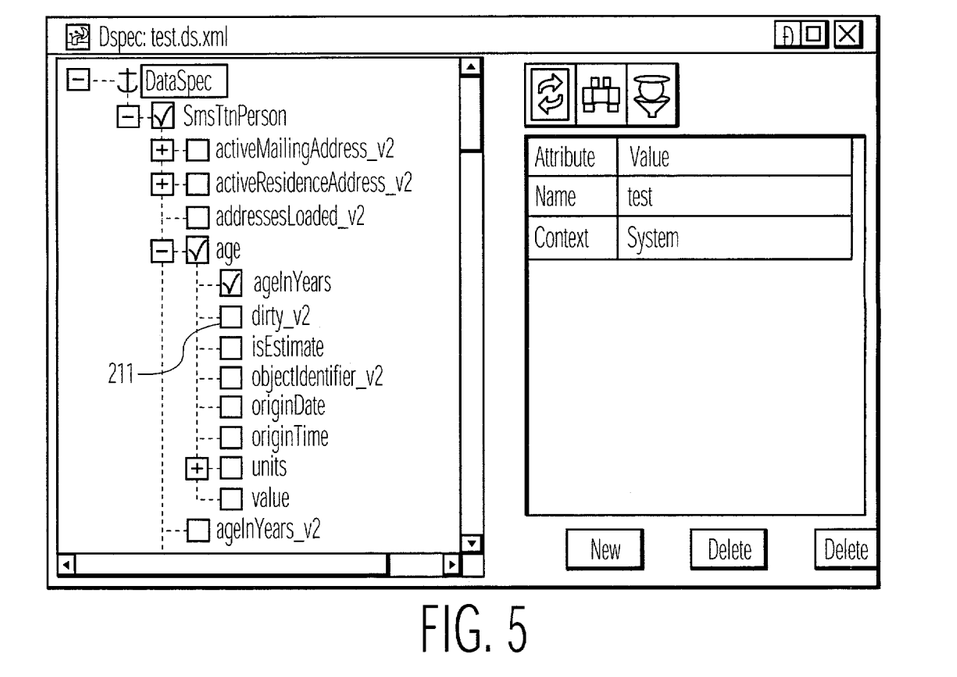
FIG. 5 shows a user interface display image representation of hierarchically structured filtered data elements, according to invention principles.
Figure 6:
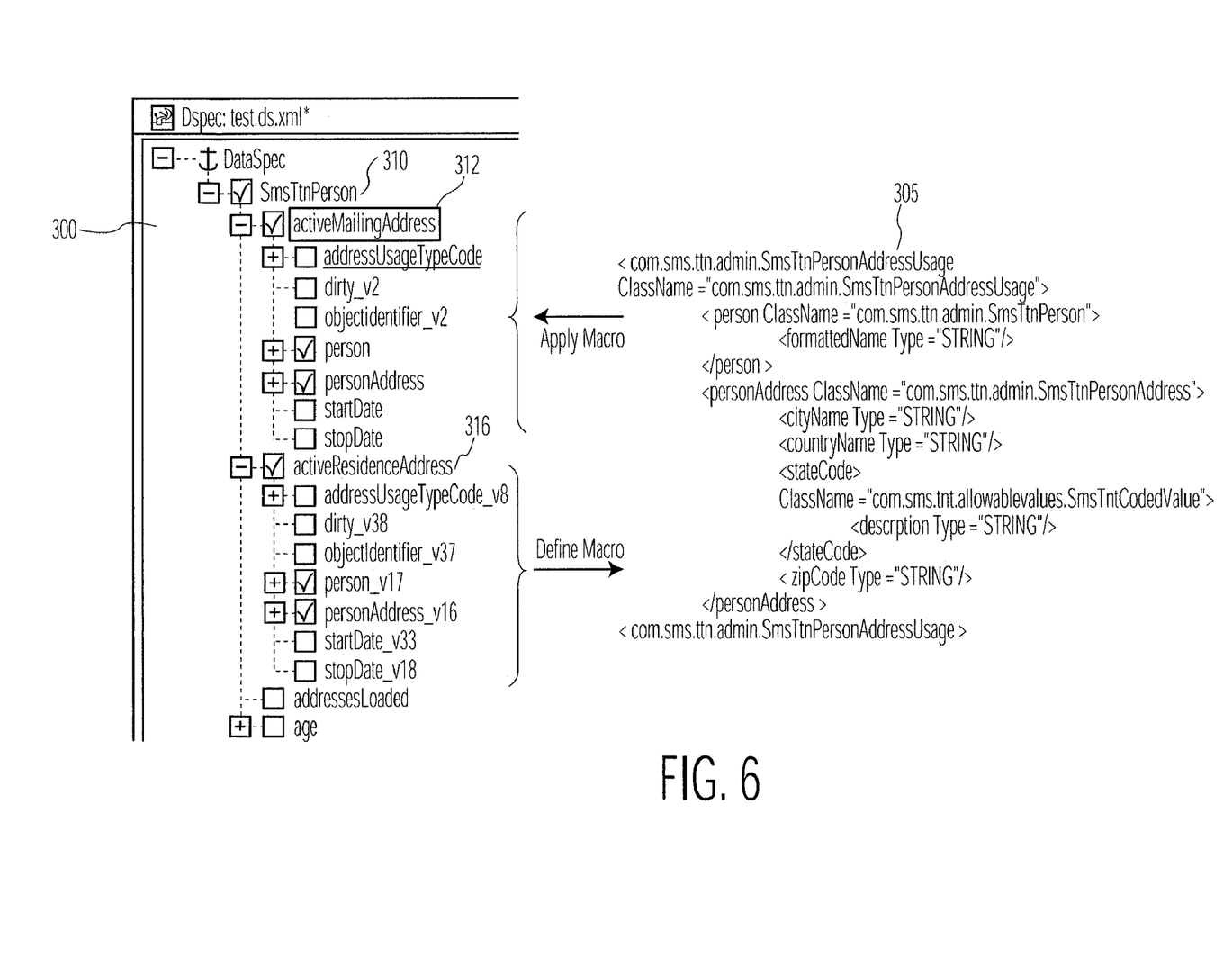
FIG. 6 shows use of a procedure for repetitively including data elements within selected encompassing hierarchically structured data elements, according to invention principles.

A user employs the FIG. 4 user interface display image to enable filtering of data elements (here class properties) by selecting individual properties to be filtered via window 200. A filter is created via window 200 in response to user selection of properties to be filtered. This is done by selection and enabling via button 207 (or disabling via button 209) of individual properties in window 200. Properties may be added or removed from the displayed list of properties in window 200 in response to user selection of add and remove buttons 203 and 205 respectively. Upon completion of selection of properties to be filtered, the filter is saved upon user selection of button 210. As an example, the "dirty" property 211 is shown as being filtered in window 200, but if it was not, the dirty property 211 would be shown in a display image representation of hierarchically structured filtered data elements as illustrated in FIG. 5. The use of property filters advantageously reduces the time involved in editing elements presented in a display image. Specifically it may be used to facilitate selection of properties used in an XML data specification (e.g. specification 17 of FIG. 1) representing object oriented or other data FIG. 6 shows use of a procedure (a macro, for example) for repetitively including data elements within selected encompassing hierarchically structured data elements. The user interface system of unit 12 (FIG. 1) enables a user to determine and apply data element inclusion patterns using such a procedure. An inclusion procedure may be created, saved and used, for example, to repetitively include desired properties for multiple property classes in generating an instance (a copy) of an application (or other executable program, procedure or method). In the illustration of FIG. 6 a procedure 305 is created for including properties of an "activeResidenceAddress" property class 316 in another selected class in window 300. Specifically, procedure 305 is used to include properties of "activeResidenceAddress" class 316 in "activeMailingAddress" class 312. Both "activeResidenceAddress" class 316 and "activeMailingAddress" class 312 are the same type as an encompassing (SmsTtnPersonAddressUsage) class 310.

Figure 7:
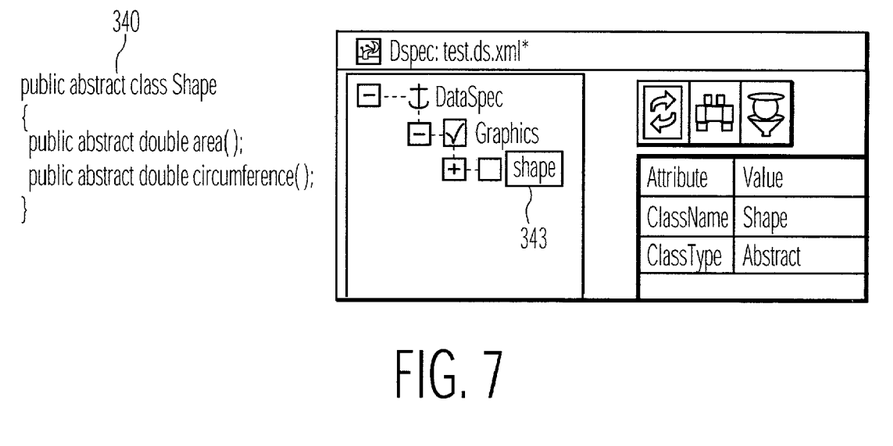
FIG. 7 shows a displayed hierarchical element structure including a particular type of class of data element, an abstract base class, of which object instances cannot be created, according to invention principles.
Figure 8:
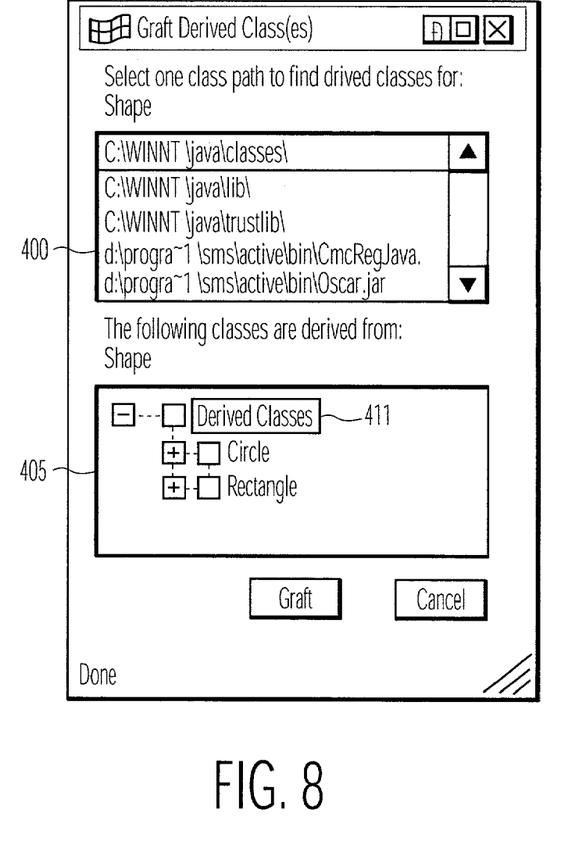
FIG. 8 shows a user interface display image supporting finding of a hierarchical element structure that is derived from a specific base (parent) class, according to invention principles.
Figure 9:
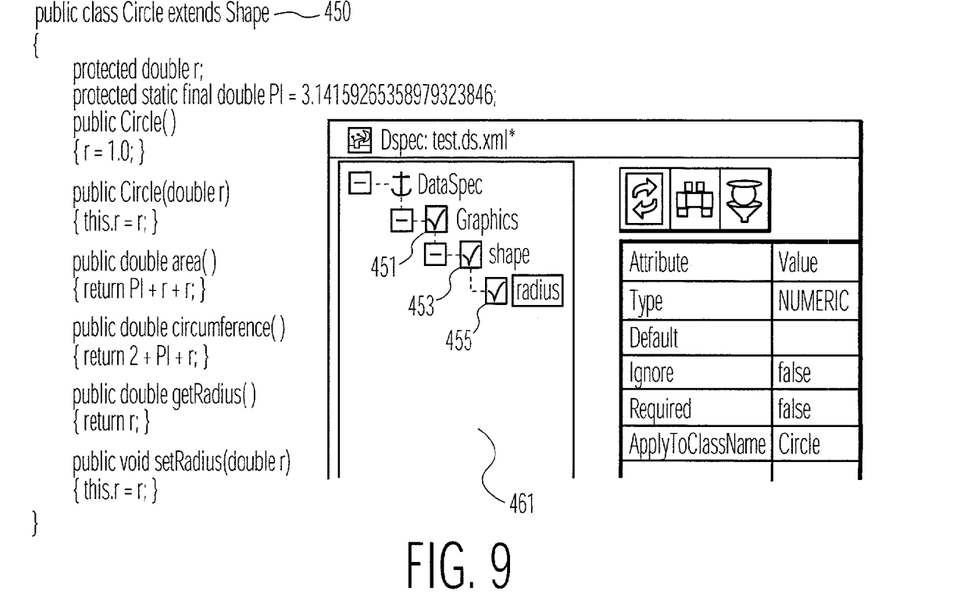
FIG. 9 shows a user interface display image supporting addition of a data element of a derived class to a hierarchical element structure, according to invention principles.

FIG. 7 shows a displayed hierarchical element structure including a particular type of class element, an abstract class, of which object instances cannot be created. Specifically, a Graphics class contains an abstract class 340 called shape (represented by display element 343). The Graphics class is added to an XML format data specification 17 (FIG. 1) via the unit 12 user interface. However, a class that derives from (extends) the Shape class may be associated with Shape class 340. The user interface system of unit 12 is able to scan a local file system for classes that are associated with abstract Shape class 340. FIG. 8 shows a user interface display image provided by the unit 12 user interface system. The FIG. 8 displayed image supports finding of a hierarchical element structure that derives from a base class structure such as abstract Shape class 340. In window 400 a user selects a desired file path for identifying classes of properties associated with an abstract class such as the Shape class. The resulting identified associated class structure 411 is displayed in window 405. The class structure associated with the abstract class includes two classes (circle and rectangle). Each of these classes is essentially a "Shape" class but including additional data elements. The unit 12 user interface system capability of finding data elements (illustrated by the display image of FIG. 8) supports finding and incorporation of class properties into a desired data structure element such as a property class. Thereby, for example, properties of the identified circle and rectangle classes may be incorporated into the Shape class element hierarchy. FIG. 9 illustrates addition of a radius property of the Circle class 450 to the Shape class element hierarchy. This is illustrated in a hierarchical data structure representation in window 461 by addition of a radius property representative item 455 to shape class representative item 453 within the Graphics class represented by item 451. The radius property is the only property of the Circle class available for inclusion because it is the only public method that is prefixed by "get". Reflection (described later) is used to discover the public "getter" methods of the Circle class.

Figure 10:
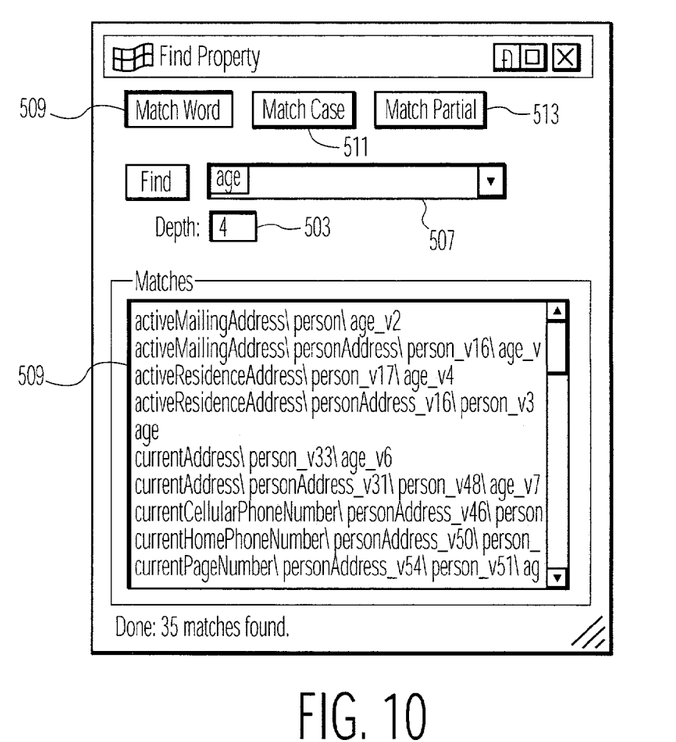
FIG. 10 shows a user interface display image supporting search of data elements in a hierarchical element structure, according to invention principles.

FIG. 10 shows a user interface display image supporting a user initiated search for data elements in a hierarchical element structure. The user interface system of unit 12 (FIG. 1) supports searching for data elements based on user entered text in prompt element 507. The search is tailored to require a word match, a character case match or a partial text (or partial word) match via user selection of buttons 509, 511 and 513 respectively. The number of hierarchical levels of the hierarchical element structure that are to be searched is selectable via search depth prompt element 503. The FIG. 10 display image functions facilitate search through multiple levels of a class hierarchy to locate data elements (class properties in this example) which are similar to the search text entered. In the illustration of FIG. 10, 35 matches are found and displayed in window 500 for the search text "age" entered in prompt element 507. The search is started from the root of a "Person" class. The search involves each child property and subclass of "Person" up to and including a depth of four levels of subclasses.

FIG. 11 shows an exemplary XML representation of data including software objects and class properties derived using the inventive principles and hierarchical data structure manipulation system described in connection with FIGS. 1-10. The user interface system of unit 12 (FIG. 1) has the ability to maintain a Data Specification 17 by loading it into an editor employing the data structure manipulation functions of unit 12. Further, in loading a Data Specification 17 into such an editor, property class data is validated by comparison with corresponding property class data stored in a local file system. Upon detection of a discrepancy, an alert is generated. Further, the data structure manipulation functions of the user interface system of unit 12 (FIG. 1) is advantageously used in conjunction with data structured according to a Reflection Design Pattern. A Reflection Design Pattern, as known in the art, provides a mechanism for changing structure and behavior of an executable application dynamically. It supports the modification of fundamental aspects, such as type structures and function call mechanisms. In a Reflection Design Pattern type structure, an application is split into two parts. The first part comprises a meta level that provides information about selected system properties and makes software self-aware. The second part comprises a base level that includes application logic. The implementation of the application logic of the base level builds on the meta level. In addition, changes to information in the meta level affects base-level behavior. Such Reflection Design Pattern type data structures are described, for example, in Pattern-Oriented Software Architecture—A System of Patterns, by F. Buschmann et al. (Wiley and Sons Ltd., 1996). More information can be found at http://www.hillside.net/patterns/books/

The data structure manipulation, processing and user interface system presented in FIGS. 1-11 are not exclusive. Other system configurations and user interface display image formats and functions may also be derived in accordance with the principles of the invention to accomplish the same objectives. Further, the inventive principles may be advantageously employed in any systems involving data structure manipulation or creation of information subsets composed of object-oriented data or other data.

What is claimed is:

1. A user interface system facilitating selection of a plurality of items from a display of hierarchically organized items, comprising:
   a user interface image generator for providing data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items; and
   a user interface command processor for initiating selection of direct ancestor icons of said grandchild icon comprising said parent icon and said individual one of said child icons excluding others of said child icons using said displayed hierarchical organization and for updating said displayed hierarchical organization to visually identify said grandchild icon and said direct ancestor icons exclusive of said others of said child icons, in response to a user command comprising user activation of a mode of selection of said grandchild icon.

2. A user interface system according to claim 1, wherein said user command comprising user activation of said mode of selection of said grandchild icon comprises user selection of at least one of, (a) said grandchild icon in said displayed hierarchical organization and (b) a display element visually associated with said grandchild icon in said displayed hierarchical organization.

3. A user interface system according to claim 1, wherein an icon comprises a user selectable image element including at least one of, (a) a data item representative element, (b) a status indicator identifying selection status of a data representative item, (c) a feature associated with a data representative item, (d) a button, (e) a prompt element, (f) a menu item, (g) a prompt element with a list of selectable options and (h) a data entry element.

4. A user interface system according to claim 1, wherein said user interface command processor records said identified parent icon, said individual one of said child icons and said grandchild icon and corresponding data items as being hierarchically associated in an XML (Extensible Markup Language) compatible file.

5. A user interface system according to claim 1, wherein said user interface image generator updates said data representing said displayed hierarchical organization to visually indicate said parent icon, said individual one of said child icons and said grandchild icon are currently selected, in response to user activation of said mode of selection of said grandchild icon.

6. A user interface system according to claim 1, wherein said user interface image generator and said user interface command processor comprise at least one executable procedure.

7. A user interface system according to claim 1, wherein said user interface image generator generates said data representing said displayed hierarchical organization in a first window and also generates a second window incorporating a menu for indicating properties affecting operation of an executable procedure associated with a user selected icon shown in said first window.

8. A user interface system according to claim 1, wherein said user activation of said mode of selection of said grandchild icon comprises at least one of, (a) double-clicking on said grandchild icon, (b) selecting an item of a menu associated with said grandchild icon and (c) an activating selection of said grandchild icon.

9. A user interface system according to claim 1, wherein said data items comprise at least one of, (a) properties and (b) attributes of an executable procedure affecting a function performed by said executable procedure.

10. A user interface system according to claim 9, wherein said data items comprise at least one of, (a) properties and (b) attributes of software objects employed by said executable procedure.

11. A user interface system facilitating selection of a plurality of items from a display of hierarchically organized menu items, comprising:
   a user interface image generator for providing data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items; and
   a user interface command processor for initiating selection of direct ancestor icons of a grandchild icon comprising a parent icon and an individual one of said child icons excluding others of said child icons and selection of said plurality of child icons using said displayed hierarchical organization and for updating said displayed hierarchical organization to visually identify said plurality of child icons are selected, in response to a single user command comprising user activation of a mode of selection of said parent icon.

12. A user interface system according to claim 11, wherein said user interface command processor excludes from selection any child icon linked to a group of grandchild icons representing a group of data items.

13. A user interface system according to claim 11, wherein said updated displayed hierarchical organization visually indicates said plurality of child icons are selected exclusively of said individual one of said child icons, in response to user activation of said mode of selection of said parent icon.

14. A user interface system according to claim 11, wherein said user interface command processor records in a file an identification of said plurality of child icons excluding any child icon linked to a group of grandchild icons representing a group of data items.

15. A user interface system facilitating selection of a plurality of items from a display of hierarchically organized items, comprising:
a user interface image generator for providing
data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items, and
a menu for use in associating at least one particular icon with a procedure for searching said hierarchical organization of said plurality of user selectable icons and corresponding data items to find a data element of a data item in response to user entered search criteria; and
a user interface command processor for initiating selection of direct ancestor icons of a grandchild icon comprising a parent icon and an individual one of said child icons excluding others of said child icons and execution of said procedure, in response to user activation of a mode of selection of a displayed icon.

16. A user interface system according to claim 15, wherein
said data element of said data item is a property of said data item,
said procedure selects target icons and
said user interface image generator updates said data representing said displayed hierarchical organization to visually indicate said target icons are currently selected, in response to user activation of said mode of selection of said displayed icon.

17. A user interface system according to claim 15, wherein
said procedure searches said hierarchical organization to a predetermined depth.

18. A user interface system according to claim 17, wherein
said user interface image generator provides a menu item supporting user entry of said search depth.

19. A user interface method for facilitating selection of a plurality of items from a display of hierarchically organized items, comprising the steps of:
initiating generation of data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items;
using said displayed hierarchical organization for initiating selection of direct ancestor icons of said grandchild icon comprising said parent icon and said individual one of said child icons excluding others of said child icons, in response to a user command comprising user activation of a mode of selection of said grandchild icon and
updating said displayed hierarchical organization to visually identify said grandchild icon and said direct ancestor icons exclusive of said others of said child icons, in response to said user command.

20. A user interface method facilitating selection of a plurality of items from a display of hierarchically organized items, comprising the steps of:
initiating generation of data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items;
using said displayed hierarchical organization for initiating selection of said plurality of child icons, in response to a user command comprising user activation of a mode of selection of said parent icon and initiating selection of direct ancestor icons of a grandchild icon comprising a parent icon and an individual one of said child icons excluding others of said child icons; and
updating said displayed hierarchical organization to visually identify said plurality of child icons are selected, in response to said user command.

21. A user interface method facilitating selection of a plurality of items from a display of hierarchically organized items, comprising the steps of:
initiating generation of,
data representing a displayable image showing a displayed hierarchical organization of a plurality of user selectable icons visually identifying whether said selectable icons are currently selected, said hierarchical organization of said plurality of icons linking a parent icon representing a first group of data items with a plurality of child icons representing corresponding data items of said first group and an individual one of said child icons links to a second group of grandchild icons representing a corresponding second group of data items, said displayable image enabling selection of direct ancestor icons of a grandchild icon comprising a parent icon and an individual one of said child icons excluding others of said child icons, and
a menu for use in associating at least one particular icon with a procedure for searching said hierarchical organization of said plurality of user selectable icons and corresponding data items to find a data element of a data item in response to user entered search criteria; and
initiating execution of said procedure, in response to user activation of a mode of selection of a displayed icon.

* * * * *